United States Patent
Povalyayev et al.

(10) Patent No.: US 10,802,831 B2
(45) Date of Patent: Oct. 13, 2020

(54) MANAGING PARALLEL PROCESSING

(71) Applicant: SAP SE, Walldorf (DE)

(72) Inventors: Viktor Povalyayev, Palo Alto, CA (US); David C. Hu, Palo Alto, CA (US); Marvin Baumgart, Palo Alto, CA (US); Michael Maris, Mountain View, CA (US)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 15/638,585

(22) Filed: Jun. 30, 2017

(65) Prior Publication Data
US 2019/0004815 A1    Jan. 3, 2019

(51) Int. Cl.
| | |
|---|---|
| *G06F 9/38* | (2018.01) |
| *G06F 9/48* | (2006.01) |
| *G06F 9/28* | (2006.01) |
| *H04L 12/24* | (2006.01) |
| *H04L 12/911* | (2013.01) |

(52) U.S. Cl.
CPC ............ *G06F 9/3891* (2013.01); *G06F 9/28* (2013.01); *G06F 9/4881* (2013.01); *H04L 41/0896* (2013.01); *H04L 47/70* (2013.01); *G06F 2209/5018* (2013.01)

(58) Field of Classification Search
CPC .................................................... G06F 9/3891
See application file for complete search history.

(56) References Cited

U.S. PATENT DOCUMENTS

| | | | | |
|---|---|---|---|---|
| 6,477,561 | B1 * | 11/2002 | Robsman | G06F 9/5083 718/102 |
| 6,769,122 | B1 * | 7/2004 | Daudel | G06F 9/3851 712/E9.053 |

(Continued)

FOREIGN PATENT DOCUMENTS

| | | |
|---|---|---|
| EP | 2819009 A2 | 12/2014 |
| WO | 2016/085680 A1 | 6/2016 |

OTHER PUBLICATIONS

"Communication: Extended European Search Report", dated Apr. 6, 2018, European Patent Office, for European Application No. 17001457.5-1221, 11pgs.

(Continued)

*Primary Examiner* — Sisley N Kim
(74) *Attorney, Agent, or Firm* — Buckley, Maschoff & Talwalkar LLC (57) ABSTRACT

A computer system is associated with a number of computers including at least one central processing unit (CPU). Managing of parallel processing on the computer system may comprise determining a scheduling limit to restrict a number of worker threads available for executing tasks on the computer system. The managing may further comprise executing a plurality of tasks on the computer system. An availability of a CPU associated with the computer system is determined based on whether a load of the CPU exceeds a first threshold. When the CPU is determined to be unavailable, the scheduling limit is reduced. A further task is scheduled for execution on one of the CPUs according to the reduced scheduling limit. The worker threads available to execute tasks on the computer system may be limited, such that the quantity of worker threads available for executing tasks does not exceed the scheduling limit.

20 Claims, 5 Drawing Sheets

(56) References Cited

U.S. PATENT DOCUMENTS

| | | | |
|---|---|---|---|
| 9,747,139 B1* | 8/2017 | Borlick | G06F 9/5094 |
| 2004/0128563 A1* | 7/2004 | Kaushik | G06F 1/3203 |
| | | | 713/300 |
| 2006/0069761 A1* | 3/2006 | Singh | H04L 67/1008 |
| | | | 709/222 |
| 2006/0080663 A1* | 4/2006 | Pospiech | G06F 9/5027 |
| | | | 718/100 |
| 2006/0101464 A1* | 5/2006 | Dohrmann | G06F 9/5066 |
| | | | 718/100 |
| 2011/0041132 A1 | 2/2011 | Andrade et al. | |
| 2011/0087815 A1* | 4/2011 | Kruglick | G06F 13/24 |
| | | | 710/260 |
| 2012/0260258 A1* | 10/2012 | Regini | G06F 9/5094 |
| | | | 718/104 |
| 2016/0078089 A1* | 3/2016 | Hu | G06F 16/21 |
| | | | 707/714 |
| 2016/0154678 A1* | 6/2016 | Vagg | G06F 9/546 |
| | | | 718/104 |
| 2016/0179570 A1* | 6/2016 | Peng | G06F 9/48 |
| | | | 718/106 |
| 2016/0335132 A1 | 11/2016 | Ash et al. | |

OTHER PUBLICATIONS

Iraklis Tsaroudakis et al.; "Task Scheduling for Highly Concurrent Analytical and Transactional Main-Memory Workloads"; Published in: Proceedings of the Fourth International Workshop on Accelerating Data Management Systems Using Modern Processor and Storage Architectures; 2013; 10 pages; (http://www.adms-conf.org/2013/psaroudakis_adms13.pdf).

Florian Wolf et al.; "Extending database task schedulers for multi-threaded application code"; Proceedings of the 27th International Conference on Scientific and Statistical Database Management; 2015; 12 pages; (http://dl.acm.org/citation.cfm?id=2791379).

Franz Färber et al.; "The SAP HANA Database—An Architecture Overview", appears in IEEE Data Eng. Bull. 35 (1): pp. 28-33 (2012); (https://www.bibsonomy.org/bibtexkey/journals%2fdebu%2fFarberMLGMRD12/rainerunfug).

* cited by examiner

MANAGING PARALLEL PROCESSING

BACKGROUND

The technical field of the present application is task management on a computer system. In particular, the present application relates to managing parallel processing when scheduling tasks on the computer system.

In the interest of computational efficiency and faster task execution, it is generally desirable to carry out operations in parallel as much as possible. For example, a shared memory programming solution, such as Open Multi-processing (OpenMP) or Intel threading building blocks, abstracts thread management and facilitates parallel programming.

Parallelization (execution of tasks in parallel) may be particularly suitable for relatively large workloads that require substantial computational resources, whereas it may be more efficient to carry out smaller tasks requiring minimal computational resources serially (without parallelization).

However, directly creating threads for management by the operating system or using a shared memory program solution, as in the examples provided above, may result in the creation of significantly more threads than central processing units (CPUs). This may be detrimental to performance, particularly in the context of a database management system (DBMS). For example, there may be excessive computational resources used in synchronization, communication, and scheduling when implementing the shared memory programming solution or otherwise allowing threads to be managed directly by the operating system in the context of tasks performed by the DBMS. Further, there may be an excessive number of context switches. Shared memory programming solutions may not also provide support for blocking operations.

SUMMARY

According to an aspect, a computer implemented method for managing parallel processing on a computer system is provided. The computer system comprises one or more computers, wherein each of the computers has at least one CPU and at least one of the computers has multiple CPUs. The method comprises determining a scheduling limit, wherein the scheduling limit restricts the number of worker threads available for executing tasks on the computer system. The method further comprises executing a plurality of tasks on the computer system. The method further comprises determining an availability of a CPU based on whether a load of the CPU exceeds a first threshold. When the CPU is determined to be unavailable, the method further comprises: reducing the scheduling limit, scheduling a further task for execution on one of the CPUs according to the reduced scheduling limit, wherein the scheduling comprises limiting the spawning (creation and execution) of further worker threads such that the quantity of worker threads available for executing tasks on the computer system does not exceed the scheduling limit.

The method may be implemented on a computing system or in a computer program product. The computer program product may be tangibly embodied in computer readable media. In particular, the computer program product may comprise computer readable instructions, which, when loaded and executed on a computing system, cause the computer system to perform operations according to the method above, or one of the embodiments discussed below. Similarly, the computing system may include components (software and/or hardware) for carrying out operations according to the method described above and the embodiments described below.

Embodiments may implement one or more of the following.

The further task may be a new task received after the scheduling limit is reduced. Alternatively, the further task may be one of the plurality of tasks. The further task may be received as a memory reference to a function specifying operations to be carried out.

Executing the plurality of tasks on the computer system may further comprise executing at least one of the tasks using at least two worker threads. The task executed using at least two worker threads may be one of the following: a data mining operation, a matrix calculation, a complex transactional or analytical query.

Executing the plurality of tasks may comprise monitoring the scheduling limit. When the task executed using the worker thread is partitionable (i.e., the task can be split into subtasks) and the scheduling limit indicates that further worker threads can be spawned, partitioning the task into subtasks that can be executed in parallel, and executing each of the subtasks on a different worker thread.

When the scheduling limit is equal to the number of worker threads executing tasks on the computer system, preventing the spawning of further worker threads.

When the scheduling limit is reduced such that the scheduling limit is less than the number of available worker threads, designating an available worker thread as unavailable.

Scheduling may be carried out by a further task scheduler that is separate from an operating system task scheduler. The further task scheduler may also be referred to as a job scheduler. The further task scheduler may work with the operating system scheduler to schedule tasks for processing or execution. The further task scheduler may be implemented or associated with an application running on the computer system, such as a DBMS. In particular, the further task scheduler may only be responsible for scheduling tasks for the application (e.g., DBMS) and not for other applications.

The plurality of tasks may include a first task scheduled by the operating system scheduler. The new task may be scheduled by the further task scheduler.

The availability of the CPU may be determined solely according to whether the load of the CPU exceeds the first threshold. Alternatively, the availability of the CPU may also be determined according to available computational resources, such as cache memory, primary memory, and network bandwidth, associated with the CPU.

The determined scheduling limit may be based on the number of CPUs of the computer system. In particular, the determined scheduling limit may be equal to the number of CPUs of the computer system.

When the scheduling limit is equal to the number of worker threads available for executing tasks and the further task is a new task, the method may comprise scheduling the further task to be executed using a single thread. In other words, in this case, the new task is performed without any parallelization.

Determining the availability of the CPUs may comprise periodically monitoring each of the CPUs and, for each CPU, determining whether a load of the CPU exceeds the first threshold. Limiting the spawning of further worker threads may comprise designating the CPU as being temporarily unavailable. In particular, the CPU may be removed from a set of addressable CPUs, such that further worker threads cannot be scheduled for execution on the CPU.

The method may further comprise periodically monitoring CPUs that are not members of the set of addressable CPUs. Further, when the load of a CPU that is not a member of the set of addressable CPUs falls below a minimum threshold, the method may further comprise adding the CPU to the set of addressable CPUs, such that further worker threads can be (are allowed to be) scheduled for execution, on the CPU and increasing the scheduling limit.

The set of addressable CPUs may refer to the CPUs upon which the operating system scheduler can schedule tasks.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for improving the security of a computer system are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In some embodiments, when handling task management, it may be desirable to provide a task scheduler separate from the operating system task scheduler in certain situations. Use of the further task scheduler may reduce the computational resources used when creating threads and reduce the number of context switches. An example of the further task scheduler is an application specific task scheduler, such as a task scheduler (exclusively or only) responsible for scheduling tasks for the DBMS. This may automate efficient usage of processing resources, especially for shared memory multicore processors, and can help developers parallelize operations. However, the further task scheduler may be disadvantageous in that it fails to account for tasks executed outside its control. For example, the DBMS task scheduler might not account for middleware tasks that impose a significant burden on the computer system, and might allow the creation of more threads than the computer system can efficiently execute.

In addition, it may be desirable for the computer system to provide support for blocking operations. Blocking operations may involve waiting for an external event, such as user input, before the operation can continue. Blocking operations may include file input/output, networking, a disk access, or operations such as database transactions that content or operate on the same data. Blocking operations may wait on the output of another process in order to complete.

Support for blocking operations may be provided by dynamically adapting the number of available worker threads to aid the operating system scheduler and saturate processing resources (e.g., CPUs of the computer system). Ideally, periods of CPU inactivity are detected and the number of active threads is adapted in order to maximize the use of available resources. Further, loads incurred by tasks should be balanced among the available resources, and scheduling overhead along with memory referencing delays should be minimized.

Accordingly, each task may determine whether to fork and execute more threads based on the number of available worker threads on the computer system. In some cases, a moving average of free worker threads in the recent past is given to a running task as a concurrency hint in order to help the task determine whether to fork.

Also, support for blocking operations, particularly contending transactions, may be achieved via phase reconciliation. For example, phase reconciliation may be implemented by splitting logical values across CPUs and executing transactions by cycling through joint, split, and reconciliation phases.

Accordingly, with these approaches (concurrency hint or phase reconciliation), efficient assignment of tasks to CPUs can be performed even if information about the tasks is imperfect. Such approaches may be particularly suitable in the context of task management for the DBMS, in which queries arrive dynamically, and information about them (e.g., CPU resources required) can only be estimated, often with a relatively high error rate.

However, it is possible that an effort to maximize parallelism or parallel processing can reduce performance in some situations, even when multiple task schedulers (including the operating system task scheduler and one or more further task schedulers) are in use. For example, in cases of high concurrency (e.g., many threads are in execution in comparison to the number of CPUs), the computational resources required for synchronization, communication, and scheduling may exceed the benefits of parallelism.

This problem can be mitigated by enabling a maximum degree of parallelism to be statically set in order to limit the number of CPUs used when performing a task.

In addition, a maximum number of threads can be statically set for the system as a whole. More sophisticated limitations may be imposed on the additional threads spawned (created and executed on a CPU) based on the threads currently executing or a historical average of the number of executing threads, as discussed above.

Also, it is possible to impose a processing time usage limit on each database instance. For example, if four database instances are sharing a server with four physical CPUs, each database instance can be limited to using not more than three physical CPUs at any time. It is also possible to configure a maximum amount of processing resources that a database instance can consume. However, such an approach may have an undesirable impact on the performance of tasks on the computer system. For example, the number of database transactions that can be performed in a specified period of time may be reduced.

Further, such approaches may be inflexible, particularly because they may fail to give sufficient consideration to the status (e.g., workload) of the computer system upon which tasks are being performed, including the workload incurred by tasks outside of the control of the further task scheduler (e.g., the DBMS task scheduler).

Moreover, the approaches discussed above (e.g., for efficient scheduling and supporting blocking operations) might not sufficiently consider situations in which processing resources of a computer system, e.g., CPUs of the computer system, are overloaded even though only a relatively small number of worker threads are in execution. In particular, one or more CPUs of the computer system may have a load that exceeds a specified threshold (e.g., over about 80% or over about 90%) even though a maximum number of available worker threads corresponding to the number of CPUs has been set and a relatively high number of worker threads (e.g., more than about 40% or more than about 50%) are still available to carry out tasks.

Accordingly, another approach to managing parallel processing may be desirable, as an alternative to or in combination with the approaches mentioned above. It may be desirable to have a flexible and dynamic approach. Further, it may be desirable to have an approach that can be integrated with the further task scheduler, such that fine grained workload prioritization, and awareness of workload characteristics and data dependencies may be achieved when scheduling tasks.

Moreover, rather than relying solely on statically specified values (e.g., from a configuration file), the computer system itself may include functionality capable of increasing or decreasing the processing resources (e.g., CPUs) available to execute tasks. Such an approach may be particularly advantageous in situations in which the further task scheduler is used and when accounting for tasks outside the control of the further task scheduler, as described above.

Technical Definitions

A CPU may be a single logical or virtual entity capable of independently executing a program or thread. For example, the CPU may be a virtual or logical core (e.g., a single logical core). The CPU may also be referred to as a processing unit, processor unit or execution unit. CPUs may be used in the context of simultaneous multithreading (e.g., hyperthreading), where multiple threads run in one cycle of a core.

A physical core may contain multiple CPUs. Multiple CPUs on a physical core may be implemented through the use of simultaneous multithreading. The physical core may be implemented with its own arithmetic logic unit, floating point unit, set of registers, pipe line, as well as some amount of cache.

Each CPU (e.g., logical core) of multiple CPUs on a physical core may have its own set of registers. When simultaneous multithreading is enabled, the CPU may be equivalent to a logical core. In this case, the number of CPUs may be the product of physical cores and threads per physical core (e.g., 2 physical cores and 3 threads per core is 6 CPUs). When simultaneous multithreading is not enabled, the CPU and the physical core may be equivalent (e.g., there are 2 physical cores and 2 CPUs).

A socket may include multiple physical cores. For example, a chip connected to the socket may have multiple physical cores. A single core socket without simultaneous multithreading may be implemented as a single CPU. Some resources on the socket may be shared between physical cores (e.g., L3-Cache, memory controller).

A computer system may be limited to a single computer or may include multiple computers. Each of the computers has at least one CPU.

Any task is a set of associated actions to be carried out on the computer system. The task may be carried out by means of one or more processors, threads or fibers. More specifically, the task may be carried out using one or more worker threads.

Tasks may be part of a workload. The workload may be a set or collection of tasks, possibly with some metadata (e.g. prioritization information, characteristics and data dependencies among the tasks) describing the tasks.

A process is used to group computational resources; a thread is an entity scheduled for execution on a CPU. A thread may execute in a process. Multiple threads may execute within one process, and may share resources such as memory. Threads may be scheduled for execution by a task scheduler.

A thread may be the smallest sequence of programmed instructions that can be managed independently by a task scheduler, e.g., an operating system task scheduler or the further task scheduler. Multiple threads may exist within a process, sharing resources such as memory.

A thread may be in one of three states:
1. Running (being executed on a CPU);
2. available or ready (runnable, temporarily stopped to let another thread run);
3. Blocking (unable to run until some external event happens, e.g., waiting for input).

A worker thread may refer to a thread that is scheduled for execution by a further task scheduler separate from a task scheduler of the operating system. The further task scheduler may be an application task scheduler, more specifically, a DBMS task scheduler.

The task scheduler (e.g., the further task scheduler) may offer an interface for executing arbitrary code from the compiler, e.g., by passing a function pointer or overriding a virtual run method from an abstract class. The task scheduler may expose synchronization primitives that can be used to synchronize threads.

A load of a CPU may be determined according to utilization of the CPU or the number of threads in a queue of the CPU. Utilization may also be referred to as usage. The load may be determined according to measurements, sometimes referred to as user CPU, system CPU, nice, and idle time.

User CPU generally reflects the number of CPU cycles that are required for user processors. System CPU may reflect the number of CPU cycles that are used by the operating system kernel. Idle time may reflect the number of cycles in which there is nothing for the CPU to do. Nice may reflect a percentage of CPU processing time occupied by user level processes with a positive nice value (i.e. a lower scheduling priority). Further, the percentage of CPU cycles spent waiting for data may also be used to determine the load of a CPU.

A transaction may be understood as a group of tasks. Each task may encapsulate one or more operations. In the context of a DBMS, operations may include insert, delete, update, or retrieve data (query).

DETAILED DESCRIPTION

The subject matter described in this application can be implemented as a method or on a device, possibly in the form of one or more computer program products. Such computer program products may cause a data processing apparatus to perform one or more techniques described or shown in the application.

The subject matter described in the application can be implemented in a data signal or on a machine-readable medium, where the medium is embodied in one or more information carriers, such as a CD-ROM, a DVD-ROM, a semiconductor memory, or a hard disk.

In addition, the subject matter described in the application can be implemented as a system including a processor, and a memory coupled to the processor. The processor may include one or more cores, each having one or more CPUs, as described above. The memory may encode one or more programs to cause the processor to perform one or more of the methods described in the application. Further subject matter described in the application can be implemented using various machines.

Details of one or more implementations are set forth in the exemplary drawings and description that follow. Other features will be apparent from the description, the drawings, and from the claims.

In the following text, a detailed description of examples will be given with reference to the drawings. It should be understood that various modifications to the examples may be made. In particular, one or more elements of one example may be combined and used in other examples to form new examples.

Figure 1:
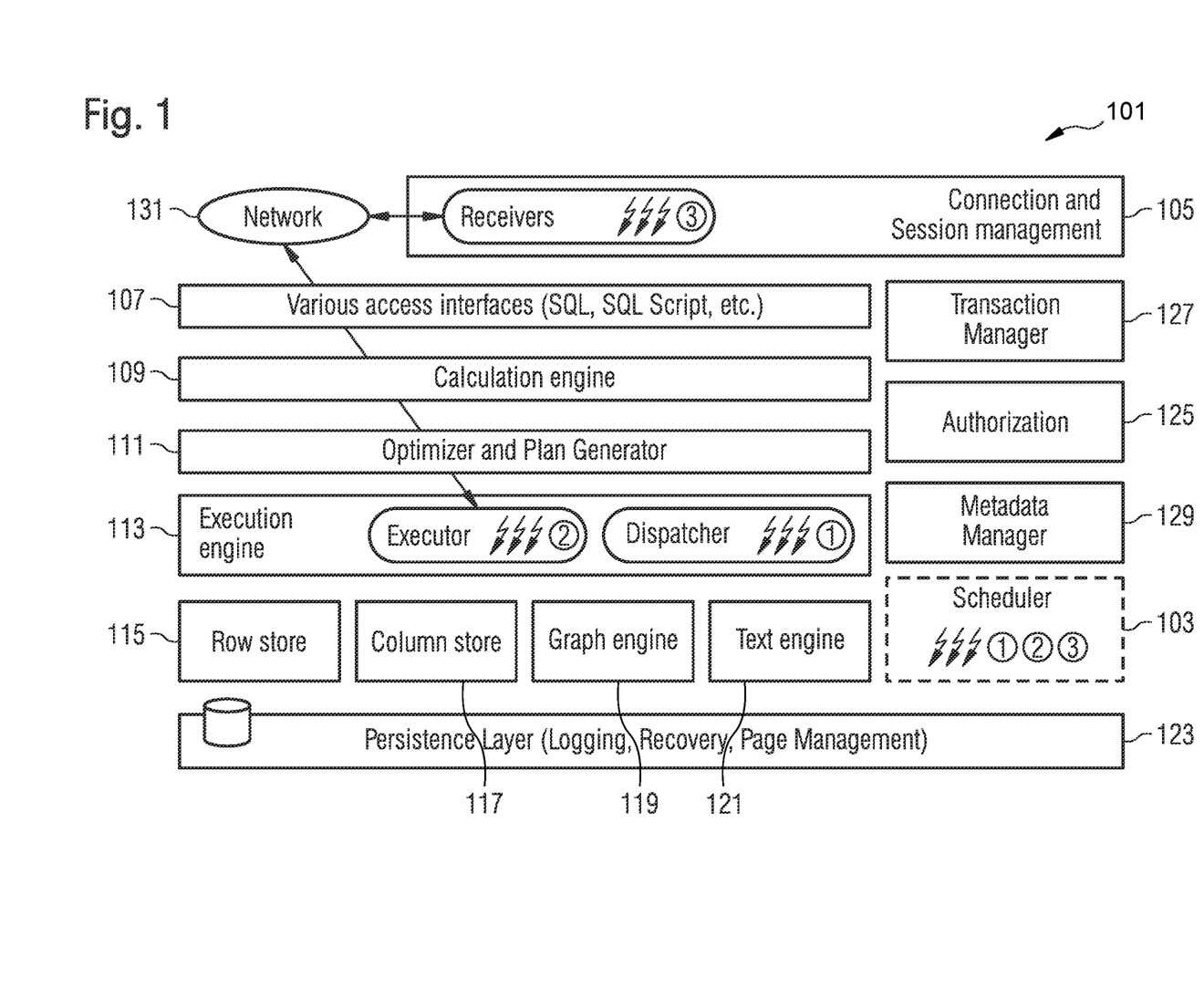
FIG. 1 shows an architecture of a DBMS in which a method for managing parallel processing on a computer system may be performed, according to one embodiment.

FIG. 1 shows an architecture of an application that may be executed on a computer system having an operating system, according to one embodiment. More particularly, an architecture of a DBMS 101 is depicted. The DBMS 101 may be in-memory. The DBMS 101 may be relational. The DBMS 101 may support transactions having one or more of the following properties: atomicity, consistency, isolation, durability (ACID). In particular, the DBMS 101 may support ACID transactions, as opposed to merely supporting basically available, soft state and eventual consistency (BASE) transactions. Specifically, the DBMS 101 may provide immediate consistency as opposed to eventual consistency. The DBMS 101 may support structured query language (SQL), particularly queries including joins (e.g., natural joins, inner joins, outer joins).

The DBMS 101 may be an implementation of SAP HANA, e.g., as described in "The SAP HANA Database—An Architecture Overview", Franz Färber, et al., 2012.

The term "in-memory" may mean that data stored in databases managed by the DBMS 101 is available and stored in main memory, which avoids the performance penalty of disk I/O or network access. Main memory may be directly accessible by CPUs of the computer system, and is sometimes implemented as volatile memory, such as random access memory (RAM) or cache memory. Further, data and/or code (e.g., library functions) may also be stored in main memory in order to facilitate parallelization. Either magnetic disk or solid state drives may be used for permanent persistency, e.g., in case of a power failure or some other catastrophe. The DBMS 101 may support both row and column storage and may be optimized for column storage (column oriented or columnar), e.g., via dictionary compression. Use of dictionary compression may reduce the number and/or size of database indices and enable data to be loaded into the cache of a processor faster.

Parallel processing may be particularly efficient in the context of column order storage. In particular, with data stored in column order storage, operations on single columns, such as searching or aggregation, can be implemented as loops over an array stored in contiguous memory locations. Further, since data stored in column order storage is already vertically partitioned, search and aggregation operations on one column out of multiple columns can be assigned to different CPUs. In other words, if multiple search or aggregation operations are being performed on a single column out of multiple columns, each one of the search or aggregation operations can be assigned to a different core or a different CPU.

Moreover, operations on one column can be parallelized by partitioning the column into multiple sections, such that each section can be processed by a different CPU or processor core.

The DBMS 101 includes various components, particularly a scheduler 103. Unless otherwise indicated, the scheduler 103 may be implemented as described in "Task Scheduling for Highly Concurrent Analytical and Transactional Main-Memory Workloads", Iraklis Psaroudakis, et al. Further, the scheduler 103 may include modifications as described in "Extending Database Task Schedulers for Multithreaded Application Code", Florian Wolf, et al.

The scheduler 103 may cooperate with a scheduler of the operating system of the computer system. In the context of the present application, various operating systems may be used. In particular, a Unix based operating system such as Linux or FreeBSD may be used. However, an alternative operating system, such as Windows server, is also possible.

The operating system may support multi-threading, particularly simultaneous multi-threading such as hyper-threading. The operating system may also support processor affinity, e.g. binding a thread to a CPU or core, or excluding a CPU from being addressed by the operating system scheduler.

For example, in the context of the Linux operating system, the command ISOLCPUS may be used to prevent worker threads from being executed on a CPU. Alternatively, the pthread_setaffinity_np function can be used to define a set of CPUs (cpuset) on which a worker thread will run. If the call to pthread_setaffinity_np is successful, and the thread is not currently running on one of the CPUs in cpuset, then it is migrated to one of the CPUs in the set defined by cpuset. Other commands could also be used to limit the worker threads available to execute tasks on the computer system.

A "worker thread" may be a thread under the control of the scheduler 103. For example, a pool of worker threads may be employed to process tasks of a workload. The tasks may be stored in task queues for processing by the worker threads. Such an approach may facilitate prioritization of tasks and assignment of tasks for processing according to characteristics of the workload. Such characteristics may include tasks that need access to the same data, tasks that require relatively limited CPU resources (e.g., simple OLTP tasks), tasks that require extensive CPU resources (e.g., complex OLTP or OLAP tasks).

The workload may have a substantial size. In some cases, if the workload is sufficiently small, it may be better to execute tasks of the workload serially, since the computational resources required to spawn, synchronize, communicate with and join threads may exceed the benefits of parallelization. Calculations may be performed initially to determine if the size of the workload (e.g., the plurality of tasks) is sufficient to justify the computational resources required for parallelization.

The method for managing parallel processing on the computer system may have a number of advantages, particularly in the context of the DBMS 101. These advantages may also be apparent in the context of other applications. For example, through task prioritization, it may be possible to manage processing of a workload including online analytic processing (OLAP) and online transaction processing (OLTP). Task prioritization provided by the scheduler 103 may prevent processing of the OLAP workload from dominating a concurrent OLTP workload.

Although parallelization can greatly speed up the processing of a variety of workloads, particularly when the workloads include complicated OLAP analysis, matrix calculations, or data mining algorithms, there may be situations in which performance can be improved by limiting further parallelization or even reducing parallelization. Such performance problems may be mitigated by considering a moving average of available worker threads in the recent past.

However, in certain situations, this may also be insufficient. In particular, situations in which a relatively small proportion of the spawned worker threads saturate or overload at least one CPU may result in reduced performance if steps are not taken with regard to limiting worker threads available to execute tasks on the computer system, e.g. by preventing further worker threads from being executed on a CPU that has been identified as being overloaded. In other words, when a load on a CPU exceeds a first threshold (e.g., the first threshold may be at least 80%, at least 85%, at least 90%, or at least 95%) a scheduling limit that restricts the number of worker threads available for executing tasks on the computer system may be reduced. Such a reduction may prevent further parallelization from being carried out on the computer system. In particular, such a reduction may prevent further worker threads from being executed on a CPU that is already overloaded. The load of the CPU may be measured in terms of the usage or utilization of the CPU. In addition, the load of the CPU may be measured in terms of the number of threads queued for execution on the CPU.

According to some conventional approaches, a scheduler may attempt to keep the total number of active worker threads (i.e. threads available for executing tasks on the computer system) as close to the number of CPUs as possible in order to saturate (i.e. maximize the use of) CPU resources. However, as discussed above, such a high level of parallelization may result in reduced system performance in some cases. In such cases, the method for managing parallel processing on the computer system as described in the present application may lead to improved performance, particularly by limiting or even reducing parallelization.

The DBMS 101 may include a connection and session management component 105. The connection and session management component 105 may include receiver threads for handling incoming queries in order to bundle the queries into tasks for the scheduler 103. The DBMS 101 may include access interfaces 107 for use by applications that connect to the DBMS 101. The DBMS 101 may further include a calculation engine 109 and an optimizer and plan generator 111.

Analytical queries and other complex operations may be processed within an execution engine 113. Four main memory storage engines may be provided, including a row store 115 suited for OLTP dominant workloads, a column store 117 suited for OLAP and mixed workloads, a graph engine 119 and a text engine 121. A persistence layer 123 may be provided for logging camera recovery, and page management. In some cases, I/O operations such as savepoints are only done periodically and in the background to minimize disruption to the performance of the DBMS 101.

The DBMS 101 also includes an authorization component 125 to handle user access control. A transaction manager 127 may use multi-version concurrency control. Accordingly, thread local storage may be used to store transactional details of queries according to multi-version concurrency control. The transactional details may then be used by the transaction manager 127. The transaction manager 127 may implement snapshot isolation.

A metadata manager 129 may be implemented as a repository of data describing tables and other data structures, which may be stored in the row store 115, the column store 117, the graph engine 119, or the text engine 121. Queries and other requests may be received via a network 131.

Figure 2:
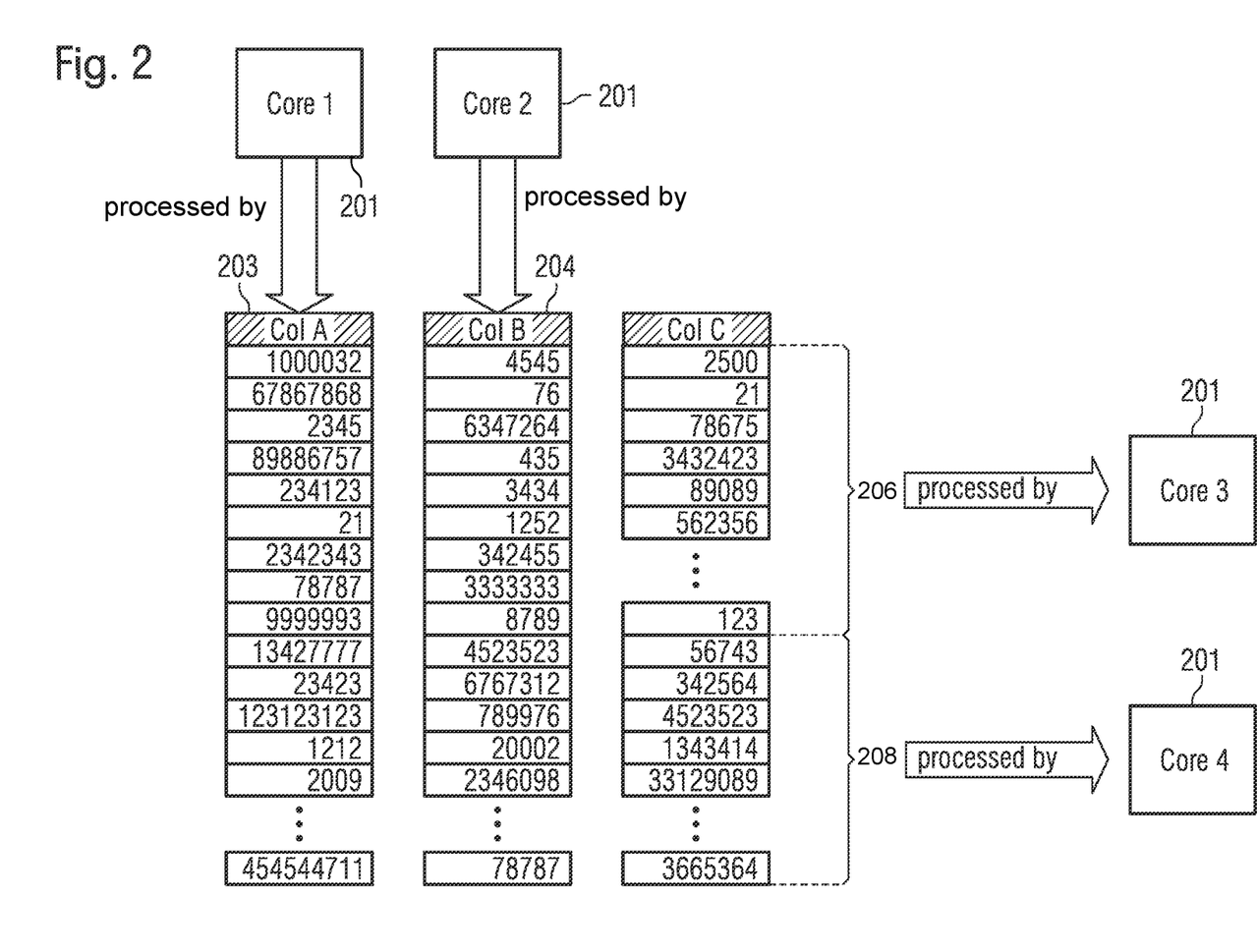
FIG. 2 shows parallel processing on a computer system in the context of a DBMS, according to one embodiment.

FIG. 2 shows parallel processing of a workload on a computer system, according to one embodiment. The computer system includes four cores 201. Each of the cores 201 may include at least one CPU. Each of the cores 201 may be part of a computer. The cores 201 may be part of the same computer or they may be part of different computers. As shown in the example, an operation (e.g. searching or aggregation) of column A 203 is assigned to one of the cores 201. The same operation on column B 204 is assigned to a different one of the cores 201. A further operation on a first part of column C 206 is assigned to a third one of the cores 201, whereas processing of the operation on a second part of column C 208 is processed by a fourth one of the cores 201.

Accordingly, the example shows a number of ways in which operations can be processed in parallel on the computer system.

Table 1 (below) shows the computer system with a minimal load.

TABLE 1

| CPU NUMBER | CPU WORKLOAD | MAX THREADS | N AVAILABLE THREADS | THREADS PER CORE | CORES PER SOCKET | N SOCKETS |
|---|---|---|---|---|---|---|
| 1 | 40 | 6 | 6 | 1 | 1 | 6 |
| 2 | 0 | ? | ? | ? | ? | ? |
| 3 | 0 | ? | ? | ? | ? | ? |
| 4 | 0 | ? | ? | ? | ? | ? |
| 5 | 0 | ? | ? | ? | ? | ? |
| 6 | 25 | ? | ? | ? | ? | ? |

According to Table 1, the computer system has six CPUs. Each of the CPUs is shown in a column labeled "CPU NUMBER". A second column labeled "CPU WORKLOAD" shows a load for each CPU. The load is expressed as a percentage of utilization of the CPU. For example, CPU number 1 is at 40% utilization, CPU number 6 is at 25% utilization and the other CPUs are at 0% utilization. The column labeled "max threads" shows a maximum number of worker threads available for executing tasks or operations on the computer system.

The column labeled "N AVAILABLE THREADS" shows a number of worker threads available to execute tasks on the computer system. Initially, this number may be equal to the maximum number of threads available for executing tasks on the computer system, represented in the column labeled "MAX THREADS". "N available threads" might be less than or equal to "max threads" but cannot be greater than "max threads". The "threadS per core" column indicates the number of threads that can be simultaneously executed for each core. The "CORES PER SOCKET" column indicates the number of physical cores per sockets. The "N SOCKETS" column indicates the number of sockets. The depicted question marks indicate that the corresponding rows are not applicable for that column.

Table 2 (below) shows the same computer system after a heavy procedure call and some light-weight procedure calls have been made on the computer system.

TABLE 2

| CPU NUMBER | CPU WORKLOAD | MAX THREADS | N AVAILABLE THREADS | THREADS PER CORE | CORES PER SOCKET | N SOCKETS |
|---|---|---|---|---|---|---|
| 1 | 25 | 6 | 5 | 1 | 1 | 6 |
| 2 | 0 | ? | ? | ? | ? | ? |
| 3 | 100 | ? | ? | ? | ? | ? |
| 4 | 0 | ? | ? | ? | ? | ? |
| 5 | 17 | ? | ? | ? | ? | ? |
| 6 | 34 | ? | ? | ? | ? | ? |

In comparison to Table 1, the values in the "CPU WORKLOAD" column of Table 2 have changed. In particular, the utilization of CPU number 3 is 100%. Accordingly, it may be determined that a load of the CPU (i.e. CPU number 3) exceeds a first threshold. In the context of the example, the first threshold is 90%. However, as discussed above, other values could be used.

The value for the first threshold may be determined in various ways. For example, the first threshold may be a specified value (i.e., a hardcoded value). Alternatively, the first threshold may be determined according a required load of the computer system (e.g., loads of all the CPUs on the computer system) required for a workload to be processed in a desired amount of time. The required load may be determined based on a history of tasks performed by the DMBS 101, including their runtime and data size. Accordingly, a unified header class may be used. The unified header class may include an estimated linear or logarithmic function, which returns an estimated runtime based on a data size.

CPU No. 3 is determined to be unavailable since the load of CPU No. 3 exceeds the first threshold. Accordingly, a scheduling limit is reduced. A further task for execution on one of the CPUs is scheduled according to the reduced scheduling limit. Also, in the present example, the number of available worker threads is reduced. This is shown by the value of "5" in the "N AVAILABLE THREADS" column. Accordingly, reduction of the scheduling limit results in reduction of the worker threads available to execute tasks on the computer system from 6 to 5. It may be desirable to refrain from deallocating the computational resources of the worker thread that is not available to execute tasks, in case the computer system becomes less busy and the worker thread can be efficiently used again. In addition, according to the example, CPU No. 3 is removed from a set of addressable CPUs, such that further worker threads are not scheduled for execution on CPU No. 3.

In addition, the operating system is prevented from scheduling worker threads on CPU number 3. In some cases, the operating system may be prevented from scheduling any further user threads on the CPU (e.g., via the pthread_setaffinity_np function or the ISOLCPUS command), as discussed above.

Periodic monitoring of each of the CPUs in the computer system may be carried out to determine their availability. In the context of the present example, such monitoring is carried out every 20 milliseconds. However, such monitoring may be carried out every 10 milliseconds, every 50 milliseconds, or somewhere in between. Other intervals are also possible.

Management of parallel processing on the computer system, as described in the example above, may be carried out using a number of library functions. The functions may be executable in-memory from the DBMS 101, such that data is not transferred to an external application or a disk, thereby enabling efficient execution. For example, one library function used may be CentralProcessingUnit::getAvailable Units( ). This function may be used to read calculated CPU performance values and compare them with the first threshold. Accordingly, this function may be used to limit the number of worker threads available to execute tasks on the computer system, or determine whether further worker threads can be spawned according to the scheduling limit.

Information regarding the load of a CPU of the computer system may be determined via CPU statistics. Such statistics may include CPU cycles used for user processors, CPU cycles used by the operating system kernel, CPU cycles spent waiting for data, CPU cycles in which the CPU is idle or there is nothing for the CPU to do, and CPU cycles used by "nice" processes or processes given a lower than normal priority.

The example above also accounts for tasks that are not managed by the scheduler 103. Such tasks may include middleware application associated tasks or other tasks performed on the computer system outside the context of the DBMS 101. Such tasks may include operating system maintenance tasks, or system updates.

Figure 3:
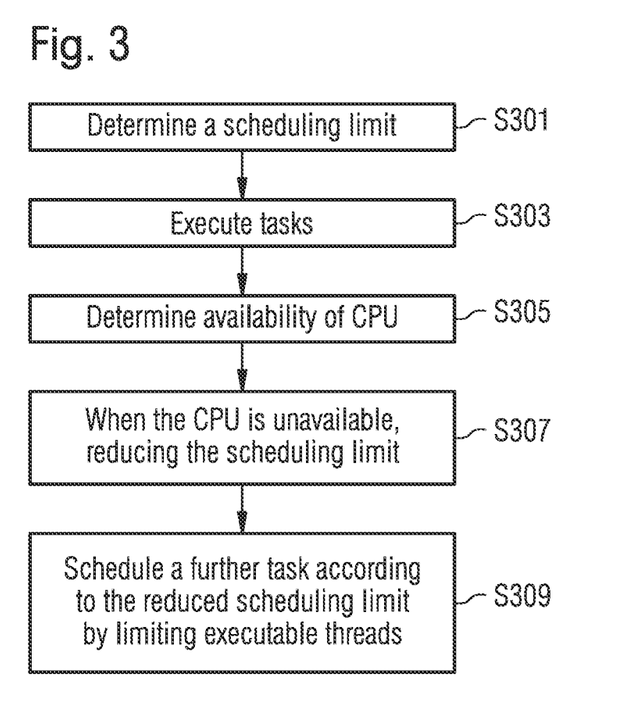
FIG. 3 shows a flow chart of a method for managing parallel processing on a computer system, according to one embodiment.

FIG. 3 shows steps of a method for managing parallel processing on the computer system. The computer system comprises one or more computers, each of the computers has at least one CPU and at least one of the computers has multiple CPUs.

In one example, the computer system executes an application. The application has an associated task scheduler separate from a task scheduler of the operating system, i.e., a further task scheduler discussed above. The application may be the DBMS 101.

In one example, the computer system includes one computer having six cores. Each core has one CPU. The computer system may also include 256 GB of RAM, and may process a workload including OLTP transactions and/or OLAP analysis queries. For example, in an exemplary workload, there may be many thousands or millions of OLTP transactions, each transaction being designed to execute in 10 milliseconds or less. Some of the transactions may need to access (contend for) the same data. Accordingly, some of the transactions may block. The exemplary workload may also include OLAP transactions that execute over a long period of time, e.g. several hours or days. In addition, the exemplary workload may include one or more of matrix calculations, data mining algorithms and other activities that benefit from parallel computation.

In some embodiments, the computer system may have 100 physical cores, each core having multiple (logical) CPUs, and two terabytes of RAM. It may be particularly advantageous to efficiently manage parallel processing on such a large scale computer system (e.g., more than about 20 CPUs or more than about 30 CPUs).

The method may comprise the following steps.

Step S301 may include determining a scheduling limit, wherein the scheduling limit limits or restricts the number of worker threads available for executing tasks on the computer system. In other words, the scheduling limit restricts the number of threads that can execute simultaneously on the computer system. Simultaneous execution may involve executing multiple threads on the same physical processor core via simultaneous multithreading (e.g. hyper-threading), and/or executing multiple threads on different processor cores of the same computer. In addition, multiple threads may execute on different computers within the computer system.

At step S303, a plurality of tasks are executed on the computer system. One or more of the tasks may be executed within worker threads scheduled by a further task scheduler (e.g., an application task scheduler such as the scheduler 103) separate from the operating system task scheduler. Other tasks may be executed in threads directly managed by the operating system task scheduler. At least one of the plurality of tasks may be part of a workload. For example, all tasks that are not scheduled by the further task scheduler may be part of the workload. In general, the term "worker thread" refers to threads managed by the further task scheduler, whereas a thread without the term "worker" is managed directly by the operating system task scheduler.

Step S305 may include determining an availability of one of the CPUs of the computer system based on whether a load of the CPU exceeds a first threshold. The availability of the CPU may be determined solely by whether the load of the CPU exceeds the first threshold. Alternatively, the availability of the CPU may also be determined based on other factors, including availability of resources associated with the CPU such as cache memory or a controller.

The load of the CPU may be measured in terms of utilization or usage of the CPU. The load of the CPU may be expressed as a percentage. Determining the availability of the CPU may comprise periodically monitoring each of the CPUs in the computer system. Accordingly, the availability of each of the CPUs in the computer system may be determined.

The scheduling limit may be reduced according to the number of CPUs that are unavailable. In particular, the scheduling limit may be reduced according to the number of CPUs having a load that exceeds the first threshold. For example, in a system having six CPUs and a maximum of six worker threads, wherein two of the CPUs have a load exceeding a first threshold of 90%, the number of worker threads available to execute tasks on the computer system could be limited to four worker threads. In particular, the scheduling limit might be reduced to four when it is detected that only four processors are available, and accordingly, scheduling may comprise limiting the number of worker threads available to execute tasks to four in order to ensure that the quantity of worker threads available for executing tasks does not exceed the scheduling limit.

At step S307, when the CPU is determined to be unavailable, the scheduling limit is reduced. In some cases, a specified minimum may be set such that the scheduling limit cannot be reduced below the specified minimum. The specified minimum may be equal to the number of physical CPUs on the computer system.

At step S309, a further task may be scheduled for execution on one of the CPUs according to the reduced scheduling limit. The further task may be a task that is already being executed on the computer system. Alternatively, the further task may be a newly received task, i.e. a task received after the scheduling limit is reduced, that is not yet being executed on the computer system. Scheduling the further task includes limiting the worker threads available to execute tasks on the computer system such that the quantity of worker threads available for executing tasks does not exceed the scheduling limit. In other words, the reduced scheduling limit may limit the number of threads that can be simultaneously executed in the computer system. Accordingly, reducing the scheduling limit may reduce parallelization of the further task.

In some embodiments, the method may comprise one or more of the following features.

The further task may be a new task received after the scheduling limit is reduced. Alternatively, the further task may be one of the plurality of tasks executing on the computer system.

Step S303 may be implemented as follows. In particular, step S303 may include steps S401 to S403 as depicted in FIG. 4.

Executing the plurality of tasks on the computer system may further comprise executing at least one of the tasks using at least two worker threads, such that operations of the task are processed in parallel. Accordingly, the task may be split into two subtasks and each of the subtasks may be executed on a different CPU simultaneously.

Figure 4:
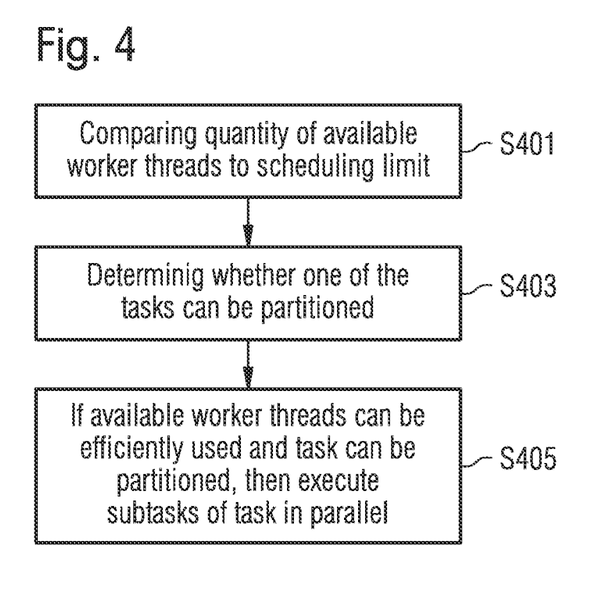
FIG. 4 shows a flow chart of steps that may be carried out when executing a plurality of tasks on a computer system, according to one embodiment.

Referring to FIG. 4, at S401, executing the plurality of tasks may comprise monitoring the quantity of worker threads available for executing tasks in comparison to the scheduling limit. For example, the monitoring may involve determining a quantity of worker threads available to execute tasks and comparing the quantity of available worker threads to the scheduling limit. At step S403, a determination may be made as to whether one or more of the tasks can be partitioned. When at least one task executed using a worker thread is partitionable and the scheduling limit indicates that there are worker threads available (i.e., that available worker threads can be efficiently used), the method further comprises partitioning the task into subtasks that can be executed in parallel. Accordingly, step S405 may comprise executing each of the subtasks in parallel on a different worker thread.

Managing the processing of analytical queries (OLAP) and transactional queries (OLTP) on the computer system can be challenging. The response time for typical transactional query is measured in milliseconds and these queries tend to be executed on a single thread. In contrast, analytical queries tend to feature more complex operations using multiple threads during execution; this can lead to higher CPU usage and memory consumption in comparison with transactional queries. Accordingly, although it is possible to statically configure limits on parallelization, limits that only affect OLTP processing, or limits that only affect OLAP processing, such static limits may be difficult and complicated to set correctly. Further, they may need to be continually modified as the load of CPUs of the computer system changes. Moreover, even if these static limits are set correctly, they may not be adequate for managing parallel processing on the computer system.

In some cases, when the scheduling limit is equal to the number of available worker threads, the method may comprise preventing worker threads from being spawned to execute tasks. Further, when the scheduling limit is equal to the number of worker threads being executed on a CPU, the method may comprise preventing additional worker threads from being used to execute tasks. Also, the method may comprise limiting the worker threads available to execute tasks by preventing further worker threads from being spawned, and/or preventing further worker threads from being executed on one of the CPUs.

The scheduling may be carried out by a further task scheduler that is separate from the operating task scheduler. The further task scheduler may be an application task scheduler, such as a DBMS task scheduler.

Worker threads available for executing tasks on the computer system may be referred to as available worker threads. The plurality of tasks may include a first task scheduled by the operating system task scheduler and a second task scheduled by the further task scheduler.

Step S305 may be implemented, at least in part, a follows. In particular, step S305 may be implemented according to one or more of the steps depicted in FIG. 5.

Availability of the CPU may be determined solely according to whether the load of the CPU exceeds the first threshold. Alternatively, availability of the CPU may also be determined according to available computational resources associated with the CPU, such as cache memory or a controller.

The determined scheduling limit may be based on the number of CPUs in the computer system. More specifically, the determined scheduling limit may be equal to the number of CPUs in the computer system.

Figure 5:
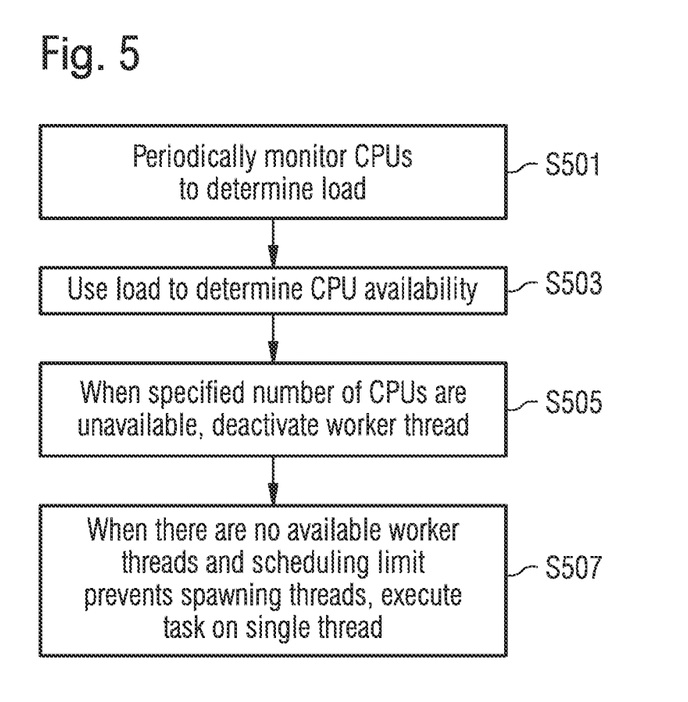
FIG. 5 shows a flow chart of steps that may be carried out when determining an availability of a CPU, according to one embodiment.

Referring to FIG. 5, at S501, determining the availability of the CPU may comprise periodically monitoring each of the CPUs to determine the load. Other aspects of computational resource usage associated with the CPU may also be determined. At S503, the availability of each of the CPUs may be determined based on the load. When the load of a specified number of the CPUs exceeds the first threshold, the method may comprise reducing the scheduling limit. The specified number may be 1, 2, or 3. Further, a worker thread may be deactivated (or made unavailable) at S505. In addition or alternatively, the method may further comprise reducing the scheduling limit according to a quantity of the CPUs determined to be unavailable. For example, if two CPUs that were previously available are determined to be unavailable during a round of periodic monitoring, the scheduling limit may be reduced by two in order to reflect the two unavailable CPUs. The number of available worker threads may be reduced accordingly.

When there are no available worker threads, and the reduced scheduling limit prevents spawning of further worker threads, and the task is received after the scheduling limit is reduced, the method may comprise scheduling the task to execute with a single thread at step S507. Accordingly, in cases of high system load, it may be advisable to execute a task serially even though this task would normally be partitioned into subtasks that are executed in parallel. However, in cases of high system load, e.g. the load of a specified number of CPUs (e.g. more than 75% of the CPUs in the computer system) exceeds the first threshold, then it may be advantageous from a performance perspective to schedule the task to execute within a single thread.

Limiting the worker threads available to execute tasks on the computer system may comprise removing the CPU from a set of addressable CPUs. In this case, further worker threads would not be scheduled for execution on the CPU. Further, removing the CPU from the set of addressable CPUs may comprise preventing the operating system from scheduling worker threads on the CPU. In addition, the operating system may be prevented from scheduling any user threads on a CPU that is not within the set of addressable CPUs.

When a CPU that is not a member of the set of addressable CPUs is determined to be available, the method may comprise adding the CPU to the set of addressable CPUs such that further worker threads can be scheduled for execution on the CPU, and increasing the scheduling limit to indicate the quantity of threads that can be scheduled for execution on the CPUs.

The CPU that is not a member of the set of addressable CPUs may be determined to be available in a number of ways. For example, when the load of the CPU falls below a minimum threshold, e.g., a value 10% less than the first threshold or a value 15% less than the first threshold. Accordingly, CPUs that are not members of the addressable CPUs can be periodically checked for their availability. The checking can be done either at specified intervals or upon request. As discussed above, tasks can be divided into subtasks that can be run in parallel or in serial, depending on CPU availability.

The scheduling limit can be used to determine a recommended thread number, and threads can be spawned according to this number. The operating system can decide on which CPU these threads will be run. Thus, checking the CPUs that are not addressable for their availability may include checking the scheduling limit. As the scheduling limit increases, CPU's that are not addressable may be reintroduced into the set of addressable CPUs.

Once the workload, including tasks and associated subtasks (if any) has been completed, worker threads spawned to carry out tasks of the workload may be joined.

What is claimed is:

1. A method comprising: managing parallel processing on a computer system comprising multiple computers and multiple central processing units (CPUs), the multiple CPUs comprising a particular CPU and a plurality of other CPUs, wherein a first computer of the multiple computers includes the particular CPU and at least a second of the multiple computers includes at least two CPUs of plurality of other CPUs, the managing comprising: determining a scheduling limit for the multiple CPUs to restrict a number of worker threads available for executing tasks on the computer system, wherein each task determines whether to fork in response to the at least one of the tasks being executed using a partitionable worker thread; executing a plurality of tasks on the computer system, the executing comprising accessing at least one of a row store or a column store to execute one or more online analytic processing (OLAP) tasks or online transaction processing (OLTP) tasks; determining at least a first threshold for a particular CPU of the computer system based on a system load for the multiple CPUs of the computer system to perform the plurality of tasks within a defined length of time; determining an availability of the particular CPU associated with the first computer based on whether a load of the particular CPU exceeds the first threshold; and at least partially in response to determining that the particular CPU is unavailable: reducing the scheduling limit for the multiple CPUs; and scheduling a further task for execution on at least one of the plurality of other CPUs of the one or more of the multiple computers other than the first computer according to the reduced scheduling limit; wherein the scheduling comprises limiting the worker threads available to execute tasks on the computer system, such that a reduced number of worker threads available for executing tasks does not exceed the scheduling limit.

2. The method of claim 1, wherein the further task comprises a new task received after the scheduling limit is reduced.

3. The method of claim 1, wherein the further task comprises one of the plurality of tasks.

4. The method of claim 1, wherein executing the plurality of tasks on the computer system further comprises executing at least one of the tasks using at least two worker threads, such that operations of the at least one of the tasks are processed in parallel.

5. The method of claim 4, wherein
at least partially in response to the at least one of the tasks being executed using a worker thread being partitionable and the scheduling limit indicating that there are worker threads available, partitioning the at least one of the tasks into subtasks to be executed in parallel, and executing the subtasks on correspondingly defined different worker threads.

6. The method of claim 1, wherein
at least partially in response to the scheduling limit being equal to the number of available worker threads, preventing further worker threads from being spawned to execute tasks; and
limiting the worker threads available to execute tasks comprises: preventing further worker threads from being spawned.

7. The method of claim 6, wherein the further worker threads are prevented from being executed on the at least one of the multiple CPUs of the computer system.

8. The method of claim 1, wherein the scheduling is to be carried out by a further task scheduler that is separate from an operating system task scheduler.

9. The method of claim 6, wherein the plurality of tasks includes a first task scheduled by the operating system task scheduler and a second task scheduled by the further task scheduler.

10. The method of claim 1, wherein
the availability of the particular CPU is to be determined solely according to whether the load exceeds the first threshold.

11. The method of claim 1, wherein
the availability of the particular CPU is to be determined according to an availability of other computational resources associated with the particular CPU.

12. The method of claim 1, wherein the determined scheduling limit is based on a number of the multiple CPUs of the computer system.

13. The method of claim 1, wherein the determined scheduling limit is equal to a number of the multiple CPUs of the computer system.

14. The method of claim 1, comprising:
at least partially in response to a specified number of the multiple CPUs being determined to be unavailable and a task being received after the scheduling limit is reduced, scheduling the task to be executed with a single thread.

15. The method of claim 1,
wherein determining the availability of the particular CPU comprises:
periodically monitoring the multiple CPUs of the computer system; and
determining an availability of another particular CPU of the plurality of CPUs separately, based on whether a corresponding load of the another particular CPU exceeds the first threshold;
wherein at least partially in response to the another particular CPU being determined to be unavailable, reducing the scheduling limit.

16. The method of claim 1, wherein determining the availability of the particular CPU comprises:
periodically monitoring the multiple CPUs of the computer system;
reducing the scheduling limit according to a quantity of the multiple CPUs associated with the computer system, wherein the quantity of multiple CPUs is determined to be unavailable.

17. The method of claim 1, wherein limiting the worker threads available to execute tasks on the computer system comprises removing the particular CPU from a set of addressable CPUs, such that further worker threads are not scheduled for execution on the at least one CPU.

18. The method of claim 1, further comprising:
adding an additional CPU to a set of addressable CPUs in response to the additional CPU being determined to be available, wherein the additional CPU is determined to be available in response a load of the additional CPU falling below a minimum threshold, and wherein further worker threads are to be scheduled for execution on the additional CPU; and
increasing the scheduling limit.

19. A computer program product tangibly embodied on a non-transitory computer-readable storage medium and comprising instructions that are executable by a computing system to cause the computing system to perform operations comprising: managing parallel processing on a computer system comprising multiple computers and multiple central processing units (CPUs), the multiple CPUs comprising a particular CPU and a plurality of other CPUs, wherein a first computer of the multiple computers include the particular CPU and at least a second of the multiple computers has at least two CPUs of the plurality of other CPUs, the managing comprising: determining a scheduling limit for the multiple CPUs to restrict a number of worker threads available for executing tasks on the computer system, wherein each task determines whether to fork in response to the at least one of the tasks being executed using a partitionable worker thread; executing a plurality of tasks on the computer system, the executing comprising accessing at least one of a row store or a column store to execute one or more online analytic processing (OLAP) tasks or online transaction processing (OLTP) tasks; determining at least a first threshold for a particular CPU of the computer system based on a system load for the multiple CPUs of the computer system to perform the plurality of tasks within a defined length of time; determining an availability of the particular CPU associated with the first computer based on whether a load of the particular CPU exceeds the first threshold; and at least partially in response to determining that the particular CPU is unavailable: reducing the scheduling limit for the multiple CPUs; and scheduling a further task for execution on at least one of the plurality of other CPUs of the one or more of the multiple computers other than the first computer according to the reduced scheduling limit; wherein the scheduling comprises limiting the worker threads available to execute tasks on the computer system, such that a reduced number of worker threads available for executing tasks does not exceed the scheduling limit.

20. A computer system for managing parallel processing, the computer system comprising: multiple computers and multiple CPUs, the multiple CPUs comprising a particular CPU and a plurality of other CPUs, wherein a first computer of the multiple computers includes the particular CPU and at least a second of the plurality of other computers includes at least two CPUs; a memory to store an application comprising instructions executable by a computing device to: determine a scheduling limit for the multiple CPUs to restrict a number of worker threads available for executing tasks on the computer system, wherein each task determines whether to fork in response to the at least one of the tasks being executed using a partitionable worker thread; execute a plurality of tasks on the computer system, the executing comprising accessing at least one of a row store or a column store to execute one or more online analytic processing (OLAP) tasks or online transaction processing (OLTP) tasks; determine at least a first threshold for a particular CPU of the computer system based on a system load for the multiple CPUs of the computer system to perform the plurality of tasks within a defined length of time; determine an availability of the particular CPU associated with the first computer based on whether a load of the particular CPU exceeds the first threshold; and at least partially in response to determining that the particular CPU is unavailable: reduce the scheduling limit for the multiple CPUs; and schedule a further task for execution on at least another one of the plurality of other CPUs of the one or more of the multiple computers other than the first computer according to the reduced scheduling limit; and wherein the scheduling comprises limiting the worker threads available to execute tasks on the computer system, such that a reduced number of worker threads available for executing tasks does not exceed the scheduling limit.

* * * * *